United States Patent [19]

Doman

[11] 3,901,721

[45] Aug. 26, 1975

[54] DOLOMITE-MAGNESITE REFRACTORY AND BATCH THEREFOR

[75] Inventor: Robert C. Doman, Painted Post, N.Y.

[73] Assignee: Corning Glass Works, Corning, N.Y.

[22] Filed: May 13, 1974

[21] Appl. No.: 469,117

[52] U.S. Cl. .................... 106/58; 106/61; 106/63
[51] Int. Cl. ................... C04b 35/04; C04b 35/06
[58] Field of Search ...................... 106/58, 61, 63

[56] References Cited
UNITED STATES PATENTS

| | | | |
|---|---|---|---|
| 2,943,240 | 6/1960 | Martinet | 106/58 |
| 3,060,042 | 10/1962 | Leatham et al. | 106/58 |
| 3,141,784 | 7/1964 | King et al. | 106/58 |
| 3,262,795 | 7/1966 | Davies et al. | 106/58 |

Primary Examiner—J. Poer
Attorney, Agent, or Firm—Barry S. Bissell; Richard N. Wardell; Clarence R. Patty, Jr.

[57] ABSTRACT

Rebonded basic refractory consisting of 65–75% −4+65 mesh coarse grain bonded with −100 mesh (preferably at least 65% thereof being −325 mesh) magnesite fines. The coarse fraction in the batch is a mechanical mixture of (based on the whole batch) 10–55% dead-burned magnesite and 15–60% fused dolomite (or equivalent mixed oxides). In the preferred embodiment, the two coarse materials are divided into each of two discrete particle size ranges, −4+12 mesh and −20+40 mesh; the former making up 45% of the batch and the latter 25% of the batch, with the fine dead-burned magnesite being the remaining 30%. The ratio of fused grain to MgO in each of these two coarse fractions is preferably substantially the same as the ratio of fused grain to coarse MgO in the whole batch.

14 Claims, No Drawings

DOLOMITE-MAGNESITE REFRACTORY AND BATCH THEREFOR

BACKGROUND OF THE INVENTION

The invention pertains to improvements in chemically basic burned refractories of the dolomite type having as principal constituents CaO and MgO. Refractories of this general type are recognized as suitable for forming the inside working linings of basic steelmaking furnaces or vessels where such linings must withstand the severe corrosive effects of the chemically basic slags, slag vapors, and other molten steelmaking ingredients. More specifically, the invention pertains to rebonded dolomitic refractories comprising coarse fused dolomitic (dolomite with or without excess MgO or CaO, or equivalent oxides) refractory grain bonded with a fine fraction of magnesite (used in the art and herein synonymously with magnesia, both terms meaning a material with periclase as the stable crystal phase).

Various U.S. patents have dealt with such rebonded basic brick. In general, rebonding a coarse fraction of basic grain with a fine magnesite fraction is taught by the prior art, particularly U.S. Pat. Nos. 2,943,240 (Martinet), 3,060,042 (Leatham, et al.), 3,262,795 (Davies, et al.), and 3,141,784 (King, et al.). It is the coarse fractions therein which distinguish the prior patents and also the present invention. Martinet teaches the use of a mechanical mixture of dead-burned dolomitic grain and dead-burned magnesite grain in his coarse fraction thereby obtaining a very dense compacted body. King discloses both a mechanical mixture and an intimately burned grain of dolomite and magnesite (the latter intimately burned grain is also disclosed by Leatham). Leatham discloses further that co-burned intimate mixtures of MgO and dolomite result in grain of greater usefulness in preparing rebonded brick than were mechanical mixtures of the separate constituents.

Davies' grain is an improvement on the coarse grain of King. It is Davies that discloses the use of the coarse grain in making compacted refractories bonded with fine MgO, and one infers that the grain of King and Leatham (referred to in Davies) could be fashioned into similar rebonded refractories. Davies' coarse grain is a melted and resolidified intimate mixture of dolomite and magnesia subsequently crushed into discrete grain. Such grain is shown to have improved resistance to converter slags over the coburned grain of King.

SUMMARY OF THE INVENTION

Contrary to the trend and the teaching of the prior art (Leatham, Davies) toward using co-burned or co-fused grain made from intimate mixtures of CaO and MgO as the coarse fraction in rebonded refractories, the present inventor has found, unexpectedly, that a mere mechanical mixture of coarse fused dolomitic (or equivalent oxide) grain, coarse dead-burned magnesite grain, and fine magnesite grain produces a compacted and burned refractory body of superior corrosion resistance to basic oxygen steelmaking slags.

Accordingly, the present invention is a size-graded particulate batch of magnesite and fused dolomite (or equivalent mixed oxides) and the compacted and burned refractories produced therefrom. The batch consists essentially of, on the weight basis, 25–35% of a fine fraction, substantially −100 mesh and composed of dead-burned magnesite, and 65–75% of a coarse fraction, substantially −4+65 mesh and composed of a mixture of, based on the whole batch, 10–55% (preferably 20–40%) dead-burned magnesite and 15–60% (preferably 30–50%) of a fused grain analyzing 50–65% CaO and 30–45% MgO (preferably at least 98% MgO + CaO) plus incidental impurities. Suitable commercially available calcined dolomites used by the inventor have produced fused grain within the more narrow range of 56–60% CaO and 40–44% MgO.

The fused grain in the coarse fraction is a melted, re-solidified and crushed mixture of refractory raw materials with the proper chemical analysis. Preferably the fused grain is made using dolomite mineral or calcined or dead-burned dolomite as the raw material. Equivalent oxides of MgO and CaO may be substituted for the dolomite although at present this substitution would result in increased raw material cost.

The coarse fraction may be a continuously ground fraction with at least 95% of the material being −4+65 mesh particle size or the fraction may be subdivided into two discrete fractions (within the same −4+65 mesh limits) for a more dense compacted refractory body. The inventor prefers that the whole refractory batch be distributed, approximately, 45% −4+12 mesh coarse magnesite and coarse fused grain, 25% −20+40 mesh coarse magnesite and coarse fused grain, and 30% −100 mesh fine magnesite.

The coarse dead-burned magnesite and coarse fused grain are preferably divided in each of the two coarse fractions in the same ratio as they are divided in the whole batch. The broad and preferred ranges for such a division are calculated (to the nearest 0.1%) and tabulated in Table I. The preferred ranges appear in parentheses.

| Mesh Sizes | Size Fraction % of batch | Fused Grain % of batch | Dead-Burned MgO % of batch |
|---|---|---|---|
| Broad- |  |  |  |
| Coarse |  | 15–60 | 10–55 |
| −4+65 | 65–75% | (30–50) | (20–40) |
| Fine |  |  |  |
| −100 | 25–35% | — | 25–35 |
| Preferred- |  | 9.6–38.6 | 6.4–35.4 |
| −4+12 | 45% | (19.3–32.1) | (12.9–25.7) |
|  |  | 5.4–21.4 | 3.6–19.6 |
| −20+40 | 25% | (10.7–17.9) | (7.1–14.3) |
| −100 | 30% | — | 30 |

In all refractory batches the fine magnesite fraction is substantially all −100 mesh and preferably at least 65% thereof is −325 mesh for denser compacted bodies and for better sintering.

In preparing the burned refractories, the raw batch materials are proportioned and then blended with a temporary organic binder such as paraffin wax or a commercial tar pitch. The refractory bodies are compacted, dried, and then fired to at least about 1600°C to bring about the ceramic bond. Fired bodies may also be tar or wax impregnated according to normal practice in the art.

DESCRIPTION OF THE PREFERRED EMBODIMENTS

The calcined dolomite used consistently in the examples is a commercially available grade analyzing 57.8% CaO, 41.2% MgO, 0.5% $SiO_2$, 0.2% $Fe_2O_3$, 0.15% Al- $_2O_3$, with 0.15% LOI.

EXAMPLE 1

A variety of commercial furnace bricks 4½ inches × 3 inches × 2¼ inches were mechanically pressed with an impact press using 14 strokes at 10,000 psi per stroke. After pressing, the bricks were placed in a gas-oxygen furnace and fired to 1600°C.

The batches used in making the bricks and the slag corrosion results are shown in Table II. In addition to the dry ingredients, a 3% binder of paraffin wax was mullered for 10 minutes with the batch at 60°C prior to compacting the brick.

| Example No. | Composition (% Total Batch) | | | Fired Bulk Density (lbs/ft³) | Slag Data | |
|---|---|---|---|---|---|---|
| | −4+12 and −20+40 fractions | | −100 mesh Dead-Burned MgO (%) | | Max. Cut (inches) | Volume Removed (in³) |
| | % Fused Dolomite | % Dead-Burned MgO | | | | |
| 1 | 14 | 56 | 30 | 178 | 0.35 | 0.92 |
| 2 | 56 | 14 | 30 | 180 | 0.39 | 0.41 |
| 3 | 28 | 42 | 30 | 179 | 0.34 | 0.57 |
| 4 | 42 | 28 | 30 | 179 | 0.36 | 0.52 |
| 5 | 7 | 63 | 30 | 178 | 0.48 | 1.74 |
| 6 | 63 | 7 | 30 | 179 | 0.44 | 0.47 |

The fused grain was made from an electrically melted and resolidified batch of calcined dolomite analyzing 57.8% CaO, 41.2% MgO, 0.5% $SiO_2$, 0.2% $Fe_2O_3$, 0.15% $Al_2O_3$, with 0.15% LOI. The melt was resolidified by casting on a graphite slab and the grain was made therefrom by crushing and sizing. In the examples, the −4+12 mesh particle fraction made up 45% of the whole batch and the −20+40 mesh particle fraction made up 25% of the whole batch. The quantities of fused dolomite and coarse dead-burned MgO were divided into each of the two coarse fractions in the same ratio of fused grain to coarse MgO as in the whole batch. For example, Table III shows the division of materials for one preferred batch of Table II.

| Particle Distribution for the Coarse Fraction in Sample 3 | | | |
|---|---|---|---|
| Constituent | % of Batch* | −4+12 mesh fraction (% of batch) | −20+40 mesh fraction (% of batch) |
| Coarse MgO | 42 | 27 | 15 |
| Fused Dolomite | 28 | 18 | 10 |
| Total | 70 | 45 | 25 |

*Ratio of Coarse MgO to Fused Dolomite in the batch is 1.5.

Typical analysis of the magnesite used throughout the examples herein was 98.5% MgO, 0.55% CaO, 0.38% $SiO_2$, and 0.44% others ($Fe_2O_3$, $Al_2O_3$, $B_2O_3$) with 0.13% LOI. Bulk density of the fine MgO fraction should be at least 2.5 grams/cc for good corrosion resistance, especially if the particle size is only −100 mesh. The bulk density is not as important in the fine fraction if the −100 mesh MgO is reduced (by milling, etc.) to at least 65% −325 mesh.

The slag test herein is a rather severe procedure devised to determine the corrosion resistance of various samples. In general, the particular slag under consideration contacts, for a specified time period, a rotating laboratory furnace cavity which is constructed from the sample refractories. An electric arc maintains the slag at a normal temperature of about 1750°C. Following the test run, the resistance of the samples is determined by measuring the depth of the slag cut into the refractory and the volume of refractory eroded (determined by filling the eroded cavity with a measured volume of sand). The relative slag resistance is then observed by comparing each refractory result with the results of the other samples of the test run. The corrosion results on each refractory in a run may also be normalized to reduce the effect of dissimilar test runs when comparing refractories from different runs, by recording results as a percent of the corrosion of a control refractory inserted into the test cavity on each run.

The slag composition in this example was 20% FeO, 53.5% CaO, 21.5% $SiO_2$ and 5.0% $Al_2O_3$, giving a lime-silica ratio of 2.5.

EXAMPLE 2

The effect of substituting dead-burned dolomite grain in the coarse fraction for the fused dolomite of the present invention was investigated using the grain distribution shown in Table IV.

| Mesh Size | % of Batch | |
|---|---|---|
| | % Dolomite | % MgO |
| −4+12 | 22½ | 22½ |
| −20+40 | 12½ | 12½ |
| −100 | — | 30 |

Bricks were pressed, burned and tested for slag resistance as in Example 1 with the results:

| | Slag Cut | Volume of Refractory Removed |
|---|---|---|
| 35% Dead-Burned Dolomite 65% MgO (35% Coarse MgO) | 0.56 in. | 0.72 inches³ |
| 35% Fused Dolomite 65% MgO (35% Coarse MgO) | 0.31 in. | 0.43 inches³ |

In addition to the superior corrosion resistance, the refractory with the fused dolomite grain showed less tendency to fracture during thermal shock and more resistance to hot face separation from the remainder of the brick.

EXAMPLE 3

Comparisons of rebonded brick using, as coarse fractions, mechanical mixtures of dead-burned dolomite plus dead-burned MgO (Sample 10), fused dolomite plus dead-burned MgO (Sample 11) and fused dolomite plus fused MgO (Sample 12) were made after bricks were pressed, burned, and tested according to the procedures of Example 1. Raw material batches were formulated as in the previous sample (Table IV), therefore with 30% MgO in the fine fraction in each sample.

| Sample | Bulk Density (lbs/ft³) Green | Fired | Slag Cut (inches) | Volume Refractory Removed (inches) | Cracking Rating | % Hot Face Separation | % Severe Separation |
|---|---|---|---|---|---|---|---|
| 10 | 177 | 182 | 0.41 | 0.63 | 3.5 | 63 | 37 |
| 11 | 178 | 179 | 0.37 | 0.56 | 2.4 | 25 | 6 |
| 12 | 184 | 178 | 0.46 | 0.73 | 1.5 | 33 | 0 |

Sample 10 - 35% Dead-Burned Dolomite + 65% Dead-Burned MgO
Sample 11 - 35% Fused Dolomite - 65% Dead-Burned MgO
Sample 12 - 35% Fused Dolomite - 35% Fused MgO - 30% Dead-Burned MgO Crack ratings are dimensionless values on a scale of 0–5 assigned to the type and size of crack formed during slag testing. The higher values indicate a greater degree of cracking.

Hot face separation is a condition which resembles initial stages of spalling. In the furnace, a dense layer which hinders slag penetration is formed on the surface of the refractory exposed to the slag. This layer in some cases pulls away from the remainder of the refractory body and may be swept away by the contact of the slag or metal in the furnace. The percentage of refractories which showed this tendency is shown in Table V.

The refractory of the present invention (Sample 11) showed superiority over the other two samples in corrosion resistance (despite a lower bulk density than Sample 10) and in tendency for hot face separation, although Sample 12 had slightly better cracking resistance and adherence of the hot face.

EXAMPLE 4

Comparison of slag resistance revealed substantially equivalent results between refractories made according to the present invention and refractories replacing the coarse fraction of the present invention with similarly sized grain crushed from a fusion cast slab made from a batch of 70% dolomite-30% MgO.

| | Particle Distributions | | | |
|---|---|---|---|---|
| | Sample 20 | | Sample 21 | |
| Mesh Size | % Fused Grain 70% Dolomite + 30% MgO | % Dead-Burned MgO | % Fused Dolomite | % Dead-Burned MgO |
| −4+12 | 45 | — | 31.5 | 13.5 |
| −20+40 | 25 | — | 17.5 | 7.5 |
| −100 | — | 30 | — | 30.0 |
| Total | 70 | 30 | 49.0 | 51.0 |

Using the batch formulation of Table VI the final compositions of each sample are fixed at 49% dolomite and 51% MgO (normalized). However, in Sample 20, the dolomite and MgO in the coarse fraction have been fused together to produce a homogeneous mixture of CaO and MgO in discrete grain. To the contrary, Sample 21, exemplary of the present invention, is a mere mechanical mixture of fused dolomite grain and dead-burned MgO. Both samples contain the 30% fine MgO bonding fraction.

Slag cut results for the two refractory Samples 20 and 21, made according to the procedure of Example 1, were only 0.01 inch apart with Sample 20 showing the lesser cut of 0.38 inches. The volume of refractory removed during the slag test was identical at 0.48 cubic inches. No significant advantage can be seen in the corrosion data for Sample 20 which would warrant the additional cost of melting and resolidifying the MgO with the dolomite in the coarse fraction.

In the foregoing specification, all mesh sizes are according to the Tyler series and all percentages, unless otherwise noted, are on the weight basis.

I claim:
1. A size-graded particulate batch for the production of basic refractory bodies and consisting essentially of, with percentages on the weight basis,
   25–35% substantially −100 Tyler mesh fine dead-burned magnesite,
   10–55% substantially −4+65 Tyler mesh coarse dead-burned magnesite, and
   15–60% substantially −4+65 Tyler mesh coarse fused grain consisting essentially of, on the oxide basis, 50–65% CaO and 30–45% MgO.

2. The batch of claim 1 wherein the coarse fused grain is composed of a melted and resolidified raw material selected from dolomite, calcined dolomite and dead-burned dolomite.

3. The batch of claim 2 wherein the fused grain analyzes, on the oxide basis, at least 98% CaO plus MgO.

4. The batch of claim 1 in which the −4+65 Tyler mesh fraction consists of, based on the whole batch,
   6.4–35.4% substantially −4+12 Tyler mesh coarse dead-burned magnesite,
   9.6–38.6% substantially −4+12 Tyler mesh coarse fused grain,
   3.6–19.6% substantially −20+40 Tyler mesh coarse dead-burned magnesite,
   5.4–21.4% substantially −20+40 Tyler mesh coarse fused grain.

5. The batch of claim 4 wherein the −4+12 Tyler mesh fraction makes up about 45% of the batch and the −20+40 Tyler mesh fraction makes up about 25% of the batch.

6. The batch of claim 1 which consists essentially of 25–35% of the fine dead-burned magnesite, 20–40% of the coarse dead-burned magnesite and 30–50% of the coarse fused grain, and wherein at least 65% of the fine dead-burned magnesite particles are −325 Tyler mesh.

7. The batch of claim 6 wherein the fused grain analyzes, on the oxide basis, at least 98% CaO plug MgO.

8. The batch of claim 6 wherein the −4+65 Tyler mesh fraction consists of, based on the whole batch,
   12.9–25.7% substantially −4+12 Tyler mesh coarse dead-burned magnesite, 19.3-32.1% substantially −4+12 Tyler mesh coarse fused grain.

7.1-14.3% substantially −20+40 Tyler mesh coarse dead-burned magnesite.

10.7-17.9% substantially −20+40 Tyler mesh coarse fused grain.

9. The batch of claim 8 wherein the −4+12 Tyler mesh fraction makes up about 45% of the batch and the −20+40 Tyler mesh fraction makes up about 25% of the batch.

10. The batch of claim 9 wherein the coarse fused grain is composed of a melted and resolidifed raw material selected from dolomite, calcined dolomite, and dead-burned dolomite.

11. A compacted and burned refractory body composed essentially of the batch of claim 1.

12. The refractory body of claim 11 which has been burned at a temperature of at least about 1600°C.

13. A compacted and burned refractory body composed essentially of the batch of claim 8.

14. The refractory of claim 13 which has been burned at a temperature of at least about 1600°C.

* * * * *